Figure 1:
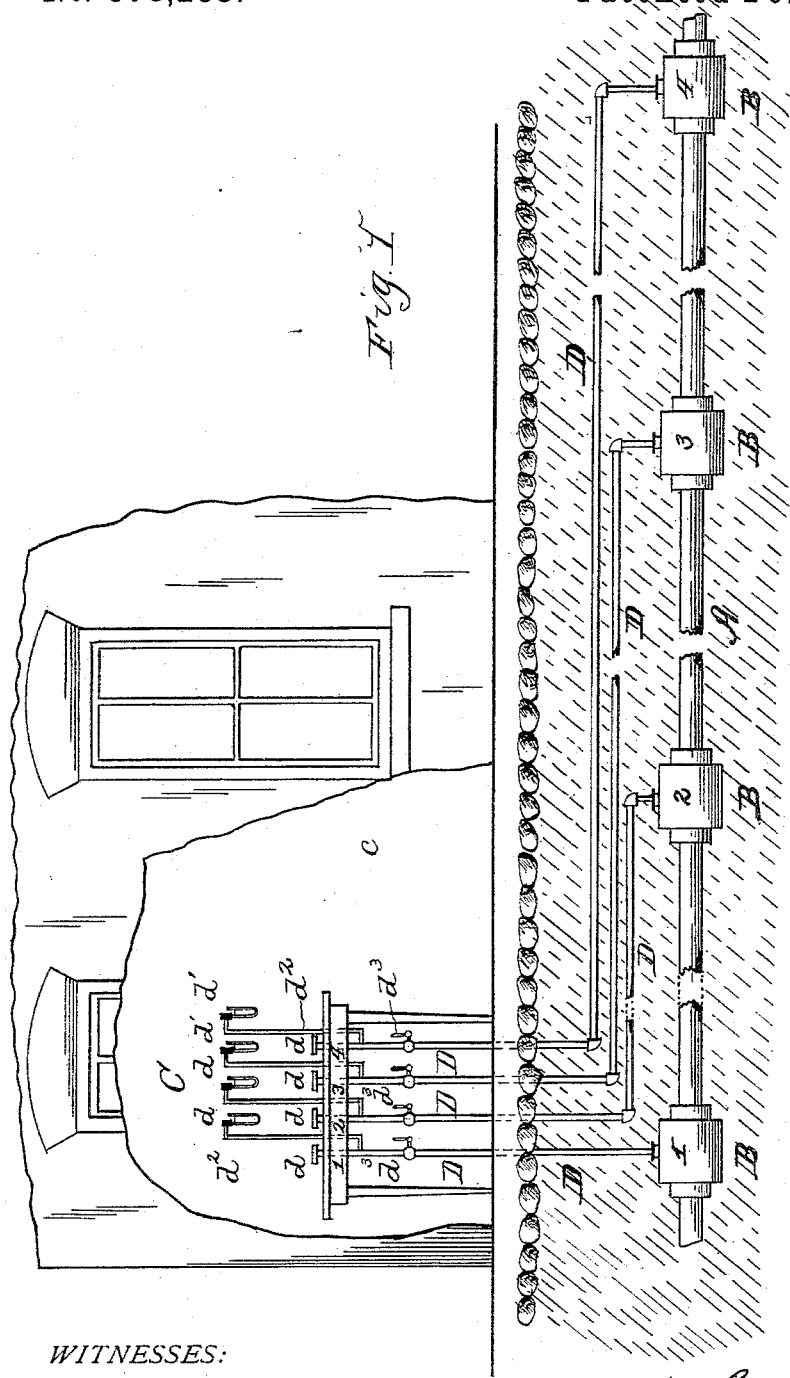

(No Model.) 4 Sheets—Sheet 1.

S. R. BRICK.
MEANS FOR DETECTING LEAKAGE FROM GAS MAINS.

No. 378,283. Patented Feb. 21, 1888.

WITNESSES:
Wm H Vanstorn
M. W. Walker.

INVENTOR
Saml R Brick
By S. J. Van Stavoren
ATTORNEY (No Model.) 4 Sheets—Sheet 3.
S. R. BRICK.
MEANS FOR DETECTING LEAKAGE FROM GAS MAINS.
No. 378,283. Patented Feb. 21, 1888.

(No Model.) 4 Sheets—Sheet 4.

S. R. BRICK.
MEANS FOR DETECTING LEAKAGE FROM GAS MAINS.

No. 378,283. Patented Feb. 21, 1888.

WITNESSES:
Wm. H. Van Horn
R. A. Smith

INVENTOR,
Saml. R. Brick
By S. J. Van Staveren,
ATTORNEY.

UNITED STATES PATENT OFFICE.

SAMUEL R. BRICK, OF STAPLETON, NEW YORK.

MEANS FOR DETECTING LEAKAGE FROM GAS-MAINS.

SPECIFICATION forming part of Letters Patent No. 378,283, dated February 21, 1888.

Application filed October 9, 1886. Serial No. 215,797. (No model.)

*To all whom it may concern:*

Be it known that I, SAMUEL R. BRICK, a citizen of the United States, residing at Stapleton, in the county of Richmond and State of New York, have invented certain new and useful Improvements in Apparatus for Ventilating and Indicating Leaking Joints in Lines of Pipes, of which the following is a specification, reference being had therein to the accompanying drawings.

My invention has relation to that form of gas mains or conduits in which the joint or union between the pipe-sections is inclosed by a casing having a ventilating-pipe for the escape of gas leaking from the joint, which ventilating-pipe has an individual indicator or alarm operated by the leaking gas for denoting visually or audibly the leakage of gas from such joints. These indicators as heretofore mainly constructed have been located at or near the joint with which they are connected. They are therefore local indicators, and unless an attendant is stationed at the indicators at or during the time they operate the occurrence of leakage denoted thereby may take place and continue for a long time before being discovered.

Attempts have been made to overcome the above-described objection by furnishing each joint with an electric-circuit closer operated by the pressure of the escaping gas to sound an alarm at a distant station. In this system, however, an alarm-station for every two or more blocks or sections of lengths of the line of the main or pipe is provided; hence these stations are local stations, and no one of them is a central station for all the joints throughout the entire length of the line of the main or pipe. Again, in this system when an alarm is sounded or received at any one of such stations a manual operation of an electric switch thereat is necessary in order to determine the location of the leaky joint along the length or block of main or pipe controlled by said station; and, further, the mechanical devices for closing the circuit at each of the pipe-joints are so arranged that no direct provision is made for leading the escaping gas to the surface of the ground for ventilating purposes.

My invention has for its object to avoid all of the above-described objections; or, in other words, to provide a central office or station which controls or has pipe-connections with all the pipe-joints throughout the entire length of a main or pipe, so that not only the location of any leaky joint therein is indicated, but such joint is also perfectly and thoroughly ventilated by the escape at the station of the leaking gas sounding or otherwise indicating an alarm, whereby the leaky joint is easily and positively indicated as soon as the leak occurs.

My invention accordingly consists of a line of gas main or conduit, all the unions or joints of which are each inclosed in a suitable casing, and of ventilating-pipes leading from all the casings to indicating devices for each such joint, said indicating devices being assembled or located at a main or central station along the line of way of the main, and are operated by the pressure of the gas escaping from the joint or joints with which they are connected; and, further, of sub-stations having indicators connected by pipes to the joint-casings, which pipes are separated from those leading to the central station, so that the indicators at the sub-stations are simultaneously and correspondingly operated with those assembled at the central station.

Various forms or arrangements of coupling the joint-casings to the indicating devices may be used, the arrangement of coupling depending upon the extent of the main or conduit and the number of joints or unions therein, some of which arrangements I will proceed to describe; but as they and all others which embrace the principle of my invention may be used as necessity requires without departing from the spirit of the invention, I do not therefore limit myself to any particular arrangement of coupling the union or joint casings to the indicating devices; nor do I confine myself to any special form of indicator.

Figure 2:
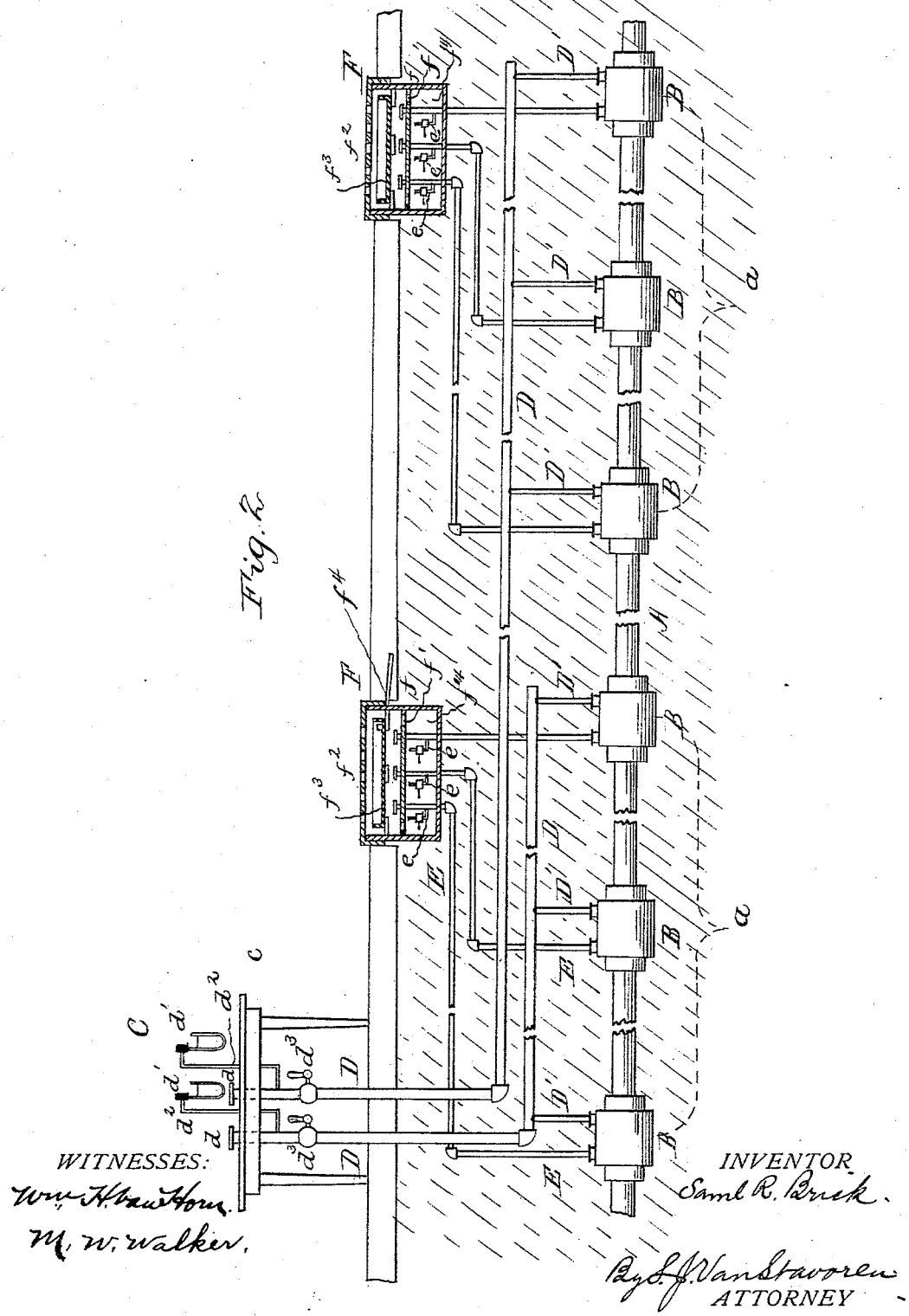
Figure 3:
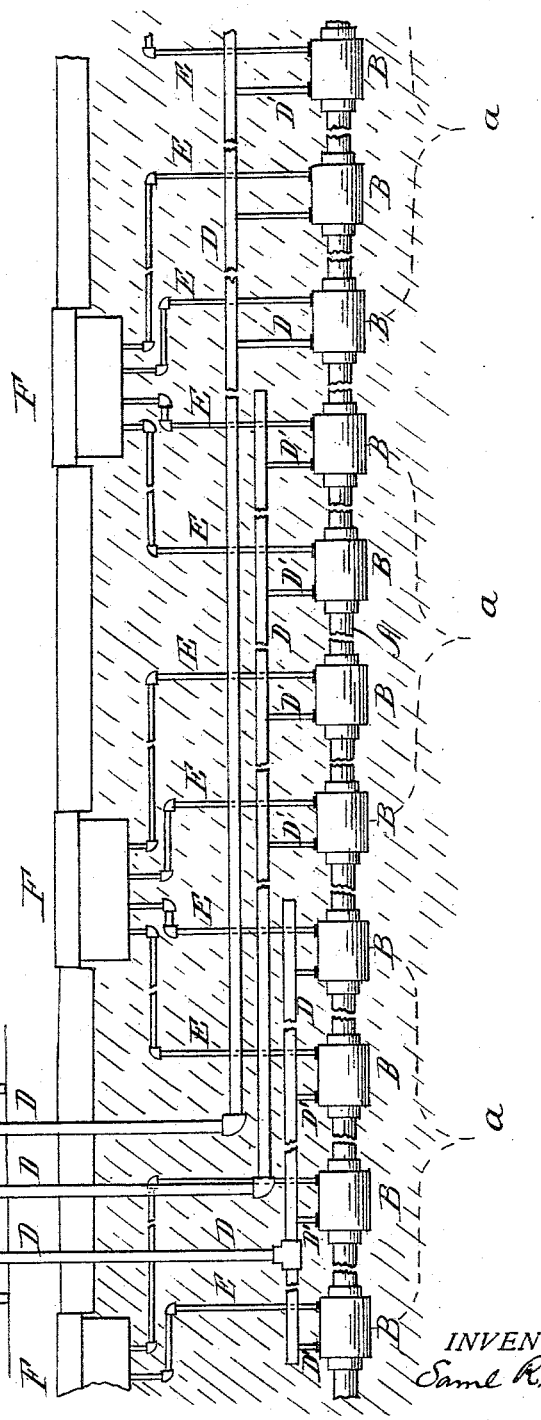
Figure 4:
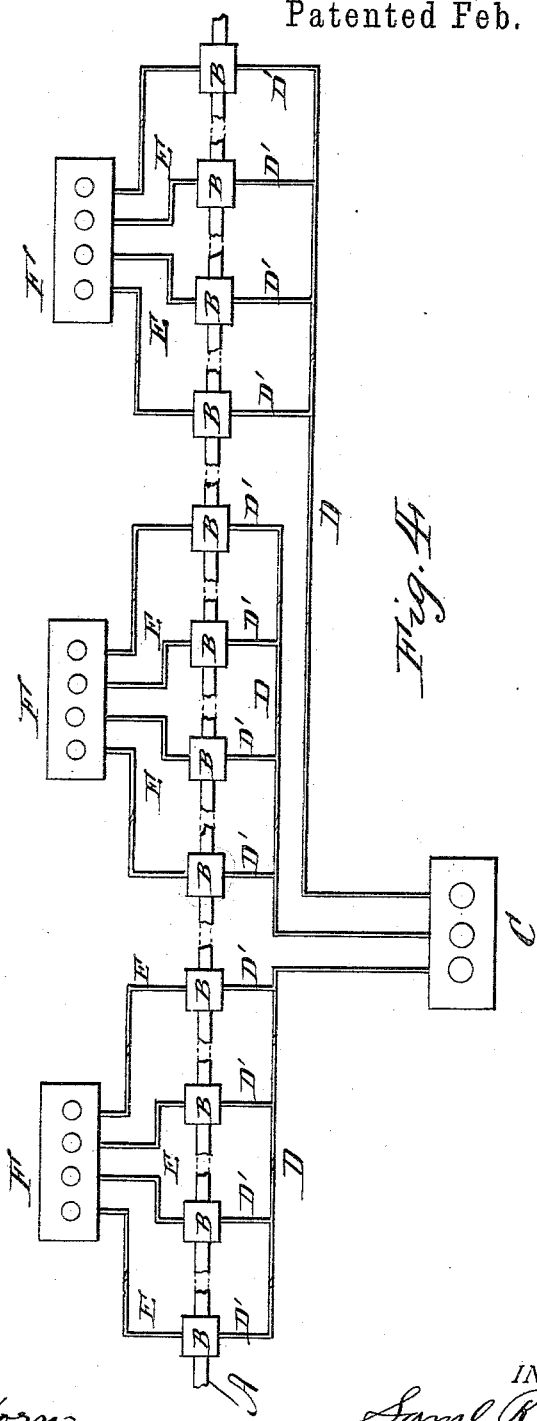

In the drawings, which illustrate some forms of coupling the union or joint casings of the main to indicating device, Figure 1 represents a sectional elevation showing a line of pipe the union or joint casings of which have separate pipe-connection with individual indicators located at one or a main station along the line of way. Fig. 2 is a like view showing two or more joint or union casings coupled to a main station, and each having another pipe or connection leading to individual indicating devices located at other distant stations or points along the line of way of the main. Fig. 3 is a like view showing a modification of same, and Fig. 4 is a diagram showing more plainly the position of the central station with regard to the street-boxes or sub-station illustrated int Figs. 2 and 3.

A represents the main or conduit, and B the casings for the joints or unions of the same, which casings may be of any suitable or desired construction; but I prefer to use the form of casing for which Letters Patent No. 327,996 were granted to me October 13, 1885.

C represents the indicating devices, which are suitably arranged upon a table connected to a wall or otherwise disposed of, as desired, in a building, office, station, or other point, c, along the line of way.

In Fig. 1 each of the joint or union casings B has a separate ventilating-pipe, D, which leads to the station c, and each pipe D has an individual indicator, d, which may have a whistle or other alarm attached to the end of the pipe, as shown, and operated by pressure of escaping gas, or a pressure-gage, $d'$, connected to a branch, $d^2$, may be used, or both whistle and gage may be employed, as illustrated. The whistle or alarm may be of any suitable construction, as also may the gage; or instead of employing these described forms of indicators any other suitable ones may be used. The pipes D each have at the station c a cock or cut-off, $d^3$, which is normally open to permit the escaping gas to pass to the indicator, or the alarm or gage forming the same.

When whistles or alarms are used, each one is preferably so made that it gives a different note or sound from that of the others to indicate positively the joint from which the gas escapes, each joint and its indicator being correspondingly numbered, as represented. The cocks $d^3$ being normally opened, any gas escaping from a joint passes into its casing B, and through the pipe D, attached thereto, and escapes from the whistle or alarm, if it be used, to sound or operate the same, or acts upon the gage, if it be employed, to indicate to the attendant at the station that a leak in a joint in the main has occurred. The number or other mark employed to characterize the joint being noted, the attendant closes the cock $d^3$ for said joint-pipe D, to shut off escape of gas at station c while repairs or other manipulations required for such leaky joint are duly made. All the joint-casings B in the line of the main or conduit have therefore ventilating-pipes which lead to indicating devices assembled at a central station, so as to be under the observation at all times of the attendants at said station, whereby any leaky joint in the main is at once indicated and its location determined.

Upon long or extended lengths of mains or conduits it is not desirable to lead a separate ventilating-pipe from each joint or union casing thereof to the central or one station, as above described, for the reason that said arrangement necessitates the clustering of an undue or a large number of pipes D, with their indicators, at one station, which is not only expensive and cumbersome, but also entails difficulty of definitely placing or ascertaining the exact alarm sounding when many are operating at the same time. I therefore, upon long lines of mains, prefer to divide them into sections or blocks a a, in a manner similar to that practiced for steam-railways, or, as shown in Fig. 2, and connect, by means of ventilating-pipes D', all the joint or union casings B of a block to a single ventilating-pipe, D, which leads to an individual whistle, d, gage $d'$, or both, as above described, at a central or main office or station, c, and further furnish each joint or union casing, B, of a block with another separate ventilating-pipe, E, which leads to an indicator box or station, F, located preferably at the surface of the pavement or roadway at a suitable point along the block. Each one of the latter has its separate secondary station or indicator box F, as shown. The ventilating-pipes E in box F are furnished with whistles or alarms, as shown, or gages may be substituted, or both gages and alarms employed, as above described for station c.

The box F is preferably composed of an oblong trough having horizontal division-plate $f$, perforated at $f'$, to which the ends of pipes E or their indicators are attached. The cover $f^2$ of box F is an open grating, or perforated, as desired, and $f^3$ is a drip-pan having, if desired, a waste-pipe, $f^4$, leading to the gutter or roadway to prevent the drip overflowing from pan $f^3$ into box F. Preferably beneath the partition $f$ the pipes E are provided with branches e, in which check-valves are suitably located, and which open under undue pressure in pipes E to permit escape of gas to chamber $f^{14}$ of box. The perforations in plate or partition $f$ and those in cover $f^2$ of box F permit of easy escape of the gas from the box at all times, and the ventilation of all the joint-casings of the main connected therewith is thus duly provided for if boxes F be used only for ventilating purposes.

The operation of last-described arrangement of coupling for the joint-casings and indicating devices is as follows: When a leak occurs in a joint-casing on a block, the escape of gas under pressure operates the whistle, gage, or indicator at the central or main station, c, and also at the same time the indicator at the secondary or block station F. The attendant at central station is thus notified of the presence of a leak somewhere in the block; but what joint-casing is leaking cannot be fixed or determined from office c. Linemen are notified to attend to station F of the block upon which the leak is indicated, and by resorting thereto the sounding of the whistle or the indicator operating thereat, as above described, the position of the leaky joint is fixed, as all the indicators in the block-stations are marked or otherwise characterized to correspond with the successive position of the joints along the block. If the pressure of gas in pipes E is at any time excessive, the check-valves in branches e automatically open and relieve the pipes of such pressure. Any leaky joint along or in an extended line of main is thus easily determined.

In Fig. 2 all the casing-joints of a block are connected by pipes E to the indicator-box for said block; but I do not confine my improvement to the same, as part of the joint-casings of one block and part of those of another block may be coupled to one indicator-box, in which case each block connects with two indicator-boxes F, as shown in Fig. 3. It is on this account that I do not confine myself to any particular arrangement of coupling the joint-casings to the indicating devices, as it is obvious that various modes of doing so may be employed without departing from the spirit of my invention.

What I claim is—

1. The combination, with a line of pipe or conduit having its section joints or unions inclosed in casings, of indicating devices assembled at a central station along the line of the pipe, and ventilating-pipes leading from said casings to the indicating devices at the central station, substantially as and for the purpose set forth.

2. The combination of a line of pipe having all its joints inclosed in casings, indicating devices assembled at a station, and a ventilating-pipe connecting each said casing with an indicating device at said station, substantially as and for the purpose set forth.

3. The combination of a line of pipe having its joints inclosed in casings, a station having indicating devices assembled therein, and ventilating-pipes having cut-off valves for connecting said casings to said indicating devices, substantially as set forth.

4. The combination of a line of pipe having its joints inclosed in casings, a station having indicating devices assembled therein, ventilating-pipes connecting said casings with said indicating devices, and other separate ventilating-pipes leading from said casings and provided with indicating devices, substantially as set forth.

5. The combination of a line of pipe having its joints inclosed in casings, a station having indicating devices assembled therein, and ventilating-pipes having cut-offs and branch pipes connecting said casings and indicating devices, substantially as set forth.

6. The combination, with a line of pipe having its joints inclosed in casings, of indicating devices assembled at a central or main station, ventilating-pipes connecting said casings and indicating devices, separate indicating devices assembled at local or sub stations, and separate ventilating-pipes connecting said casings with the indicating devices at the sub-stations, substantially as set forth.

7. The combination of a line of pipe having its joints inclosed in casings, a station having a number of indicating devices and ventilating-pipes leading to said casings, and other separate ventilating-pipes leading from said casings to indicating devices assembled at sub-stations located at intervals along the length of the line of pipe, substantially as set forth.

8. In combination with a line of pipe having its joints inclosed in casings, a main station having an assemblage of indicating devices, ventilating-pipes having cut-off valves connecting said casings and indicating devices, sub-stations located at intervals along the line of pipe, indicating devices assembled at said sub-stations, and separate ventilating-pipes connecting said casings with the sub-station indicating devices, substantially as set forth.

9. The combination, with a line of pipe havings its joints inclosed in casings, of ventilating-boxes or sub-stations located at intervals along the line of pipe, separate indicating devices assembled in said sub-stations, and a ventilating-pipe leading from each of said indicating devices to a casing on the line of pipe, substantially as set forth.

In testimony whereof I affix my signature in presence of two witnesses.

SAM. R. BRICK.

Witnesses:
S. J. VAN STAVOREN,
CHAS. F. VAN HORN.